United States Patent
Kim

(10) Patent No.: US 12,356,354 B2
(45) Date of Patent: Jul. 8, 2025

(54) METHOD AND APPARATUS FOR DETERMINING UPLINK TRANSMISSION TIMING BASED ON NTN CONFIGURATION IN MOBILE WIRELESS COMMUNICATION SYSTEM

(71) Applicants: BLACKPIN INC., Seoul (KR); Soenghun Kim, Hanam-si (KR)

(72) Inventor: Soenghun Kim, Hanam-si (KR)

(73) Assignee: Blackpin Inc., Seoul (KR)

( * ) Notice: Subject to any disclaimer, the term of this patent is extended or adjusted under 35 U.S.C. 154(b) by 0 days.

(21) Appl. No.: 18/769,913

(22) Filed: Jul. 11, 2024

(65) Prior Publication Data

US 2025/0048295 A1 Feb. 6, 2025

(30) Foreign Application Priority Data

Aug. 4, 2023 (KR) ........................ 10-2023-0101943

(51) Int. Cl.
*H04W 56/00* (2009.01)
*H04W 84/06* (2009.01)

(52) U.S. Cl.
CPC ........ *H04W 56/0045* (2013.01); *H04W 84/06* (2013.01)

(58) Field of Classification Search
CPC ......................... H04W 56/0045; H04W 84/06
USPC ................................................ 370/252, 329
See application file for complete search history.

(56) References Cited

U.S. PATENT DOCUMENTS

| | | | | |
|---|---|---|---|---|
| 10,236,951 | B2 * | 3/2019 | Park | H04B 7/06 |
| 2022/0330187 | A1 * | 10/2022 | Cheng | H04W 56/004 |
| 2023/0044346 | A1 * | 2/2023 | Nuggehalli | H04W 4/24 |
| 2023/0300768 | A1 * | 9/2023 | Atungsiri | H04W 56/0045 |
| | | | | 370/503 |
| 2023/0397061 | A1 * | 12/2023 | Huang | H04W 36/0061 |
| 2023/0413364 | A1 * | 12/2023 | Huang | H04W 36/00837 |
| 2024/0196310 | A1 * | 6/2024 | Sedin | H04W 48/08 |

OTHER PUBLICATIONS

[No Author Listed], "3rd Generation Partnership Project; Technical Specification Group Radio Access Network; NR; Physical layer procedures for control (Release 17)," 3GPP TS 38.213 V17.6.0, Jun. 2023, 262 pages.

[No Author Listed], "3rd Generation Partnership Project; Technical Specification Group Radio Access Network; NR; Medium Access Control (MAC) protocol specification (Release 17), " 3GPP TS 38.321 V17.5.0, Jun. 2023, 253 pages.

(Continued)

*Primary Examiner* — Ricardo H Castaneyra
(74) *Attorney, Agent, or Firm* — Fish & Richardson P.C.

(57) ABSTRACT

Aspects of the present disclosure are to address the problems of performing time-based reconfiguration in mobile network. The method of the terminal includes receiving a first system information, receiving a second system information, determining a total amount of timing advance (TTA) based on the first NTN configuration or based on second NTN configuration and performing uplink transmission based on the TTA. The TTA is determined based on, before the stop time, the first NTN configuration and the constant offset. The TTA is determined based on, after the stop time, the second NTN configuration and the constant offset.

15 Claims, 9 Drawing Sheets

(56) References Cited

OTHER PUBLICATIONS

[No Author Listed], "3rd Generation Partnership Project; Technical Specification Group Radio Access Network; NR; NR and NG-RAN Overall Description; Stage 2 (Release 17)," 3GPP TS 38.300 V17.5.0, Jun. 2023, 211 pages.

[No Author Listed], "3rd Generation Partnership Project; Technical Specification Group Radio Access Network; NR; Radio Resource Control (RRC) protocol specification (Release 17)," 3GPP TS 38.331 V17.5.0, Jun. 2023, 1328 pages.

[No Author Listed], "Report of 3GPP TSG RAN WG2 meeting #121bis-e, Online," Apr. 170-26, 2023R2-2306553, 316 pages.

[No Author Listed], Report of 3GPP TSG RAN WG2 meeting #122, Incheon, Korea, May 22-26, 2023, R2-2307001, 339 pages.

\* cited by examiner

User Plane Protocol Stack

Control Plane Protocol Stack

METHOD AND APPARATUS FOR DETERMINING UPLINK TRANSMISSION TIMING BASED ON NTN CONFIGURATION IN MOBILE WIRELESS COMMUNICATION SYSTEM

CROSS-REFERENCE TO RELATED APPLICATION

This application claims priority to and the benefit of Korean Patent Application No. 10-2023-0101943, filed on Aug. 4, 2023, the disclosure of which is incorporated herein by reference in its entirety.

BACKGROUND

Technical Field

The present disclosure relates to performing time-based reconfiguration in wireless mobile communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. In addition, in the 5G communication system, a non-terrestrial network is introduced with the goal of providing seamless coverage for the area where terrestrial network does not cover.

SUMMARY

Aspects of the present disclosure are to address the problems of performing time-based reconfiguration in mobile network. The method of the terminal includes receiving a first system information, receiving a second system information, determining a total amount of timing advance (TTA) based on the first NTN configuration or based on second NTN configuration and performing uplink transmission based on the TTA. The TTA is determined based on, before the stop time, the first NTN configuration and the constant offset. The TTA is determined based on, after the stop time, the second NTN configuration and the constant offset.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present invention, "trigger" or "triggered" and "initiate" or "initiated" can be used interchangeably.

In the present invention, UE and terminal can be used interchangeably. In the present invention, NG-RAN node and base station and GNB can be used interchangeably.

Figure 1A:
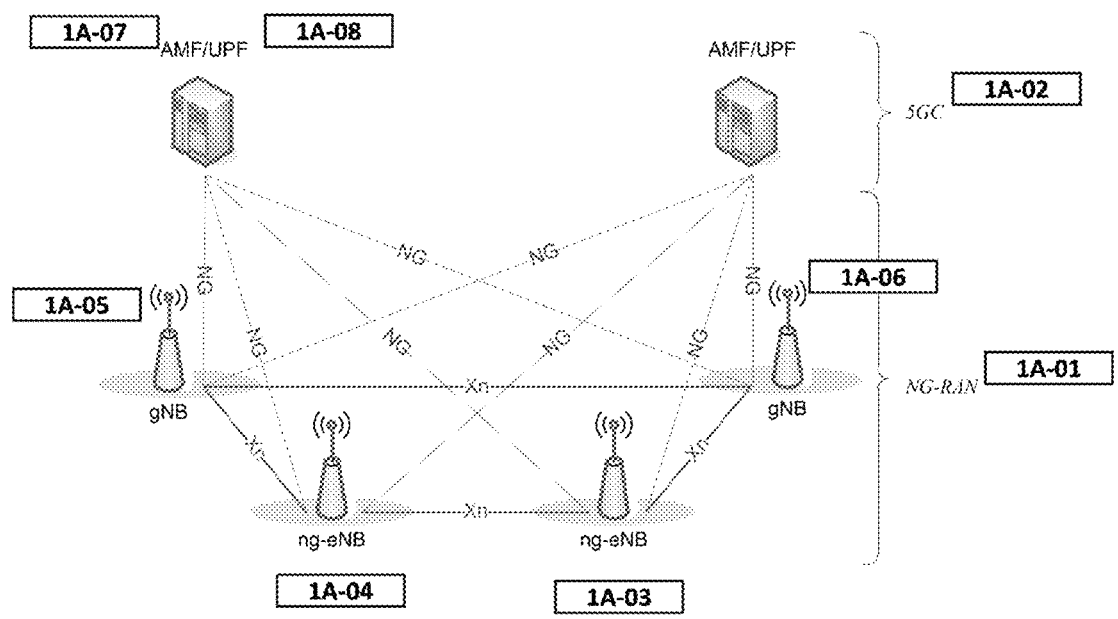
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
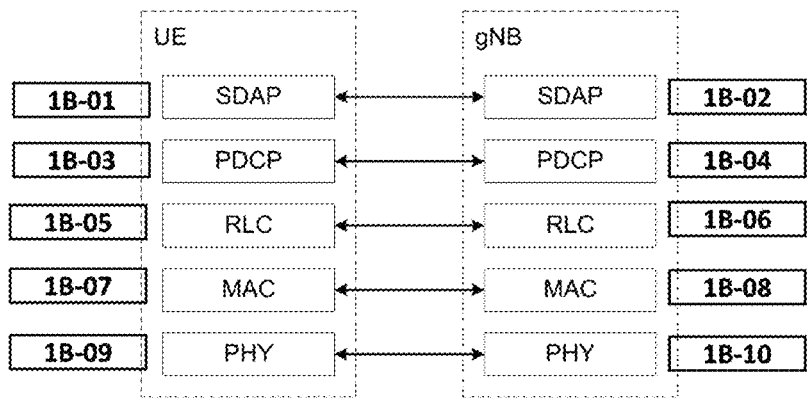
FIG. 1B is a diagram illustrating a wireless protocol architecture in an 5G system to which the disclosure may be applied.
Figure 1B:
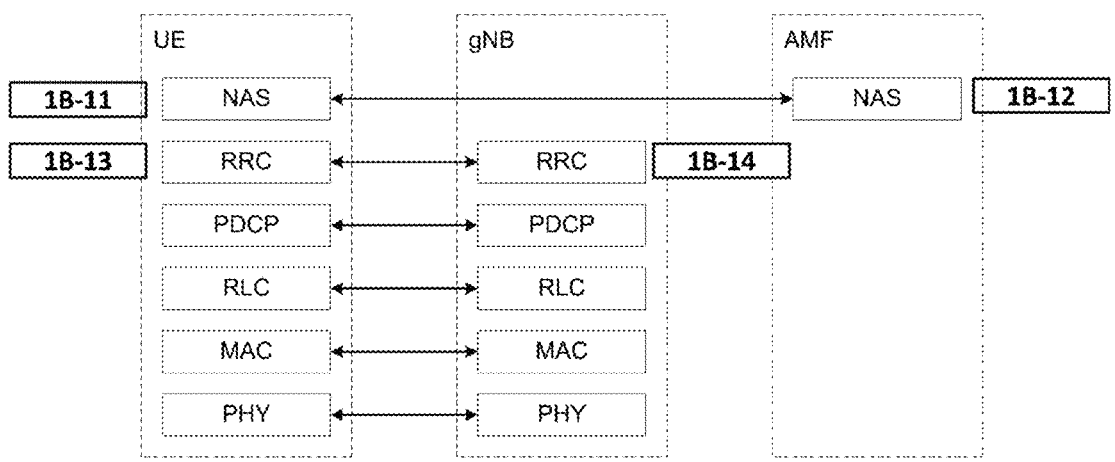

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

The terminal supports three RRC states.

RRC_IDLE state can be characterized with followings:

PLMN selection; Broadcast of system information;

Cell re-selection mobility;

Paging for mobile terminated data is initiated by 5GC;

DRX for CN paging configured by NAS.

RRC_INACTIVE state can be characterized with followings:

PLMN selection; Broadcast of system information;

Cell re-selection mobility;

Paging is initiated by NG-RAN (RAN paging);

RAN-based notification area (RNA) is managed by NG-RAN;

DRX for RAN paging configured by NG-RAN;

5GC-NG-RAN connection (both C/U-planes) is established for UE;

The UE AS context is stored in NG-RAN and the UE;

NG-RAN knows the RNA which the UE belongs to.

RRC_CONNECTED state can be characterized with followings:

5GC-NG-RAN connection (both C/U-planes) is established for UE;

The UE AS context is stored in NG-RAN and the UE;

NG-RAN knows the cell which the UE belongs to;

Transfer of unicast data to/from the UE;

Network controlled mobility including measurements.

Figure 1C:
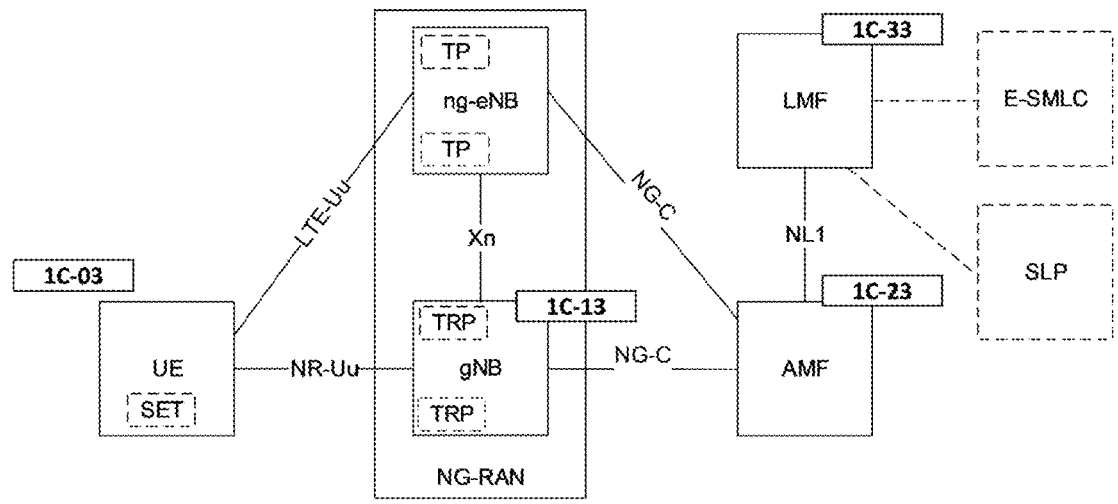
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

Figure 1D:
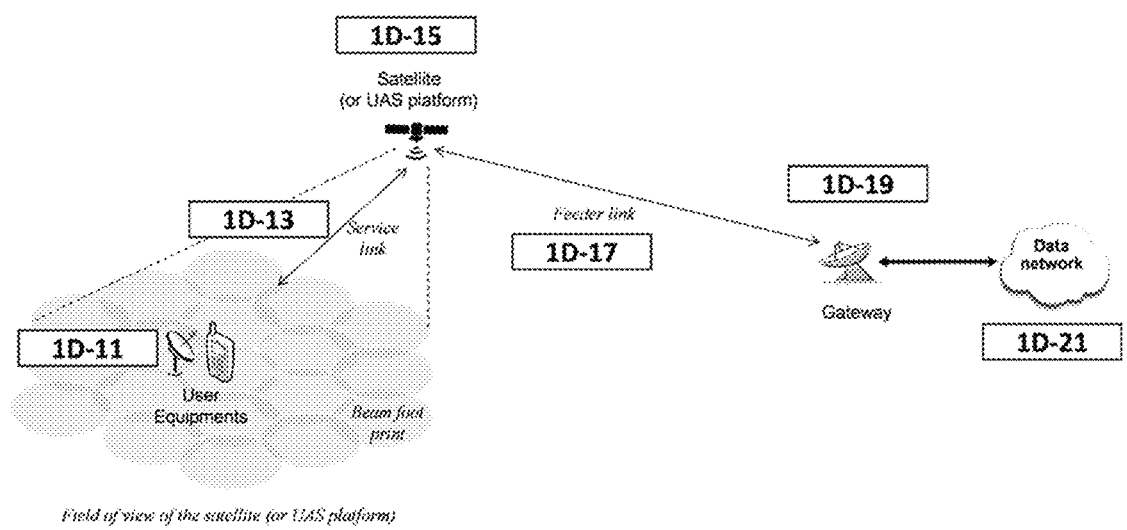
FIG. 1D is a diagram illustrating architecture of NTN

FIG. 1D is a diagram illustrating architecture of NTN.

A non-terrestrial network refers to a network, or segment of networks using RF resources on board a satellite (or UAS platform).

The typical scenario of a non-terrestrial network providing access to user equipment is depicted in FIG. 1D.

Non-Terrestrial Network typically consists of the following elements:

One or several sat-gateways 1D-19 that connect the Non-Terrestrial Network to a public data network 1D-21. A Feeder link 1D-17 or radio link between a sat-gateway and the satellite. A service link 1D-13 or radio link between the user equipment and the satellite. A satellite 1D-15 providing RF resource. User Equipment 1D-11 served by the satellite within the targeted service area.

Figure 1E:
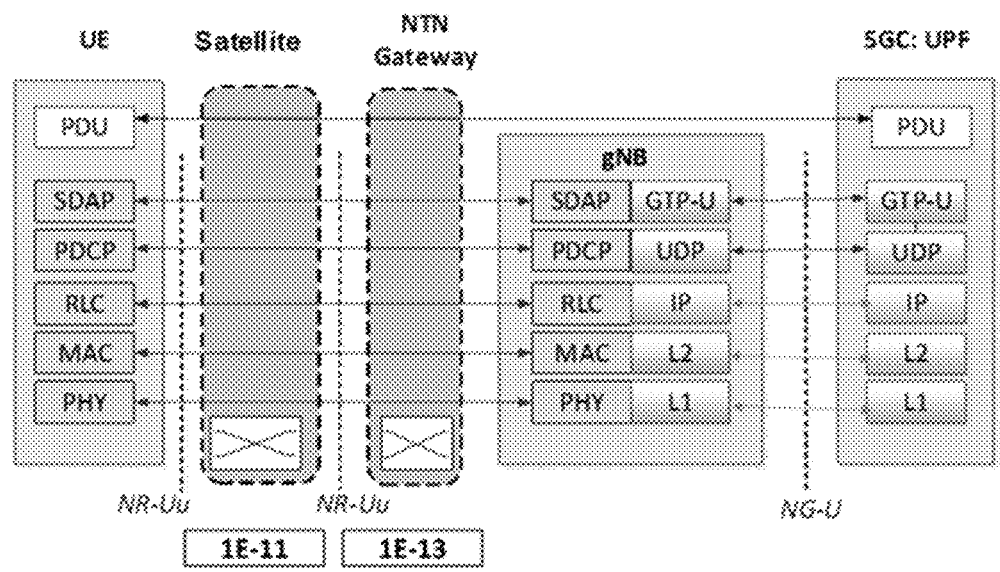
FIG. 1E is a diagram illustrating protocol architecture of NTN.
Figure 1E:
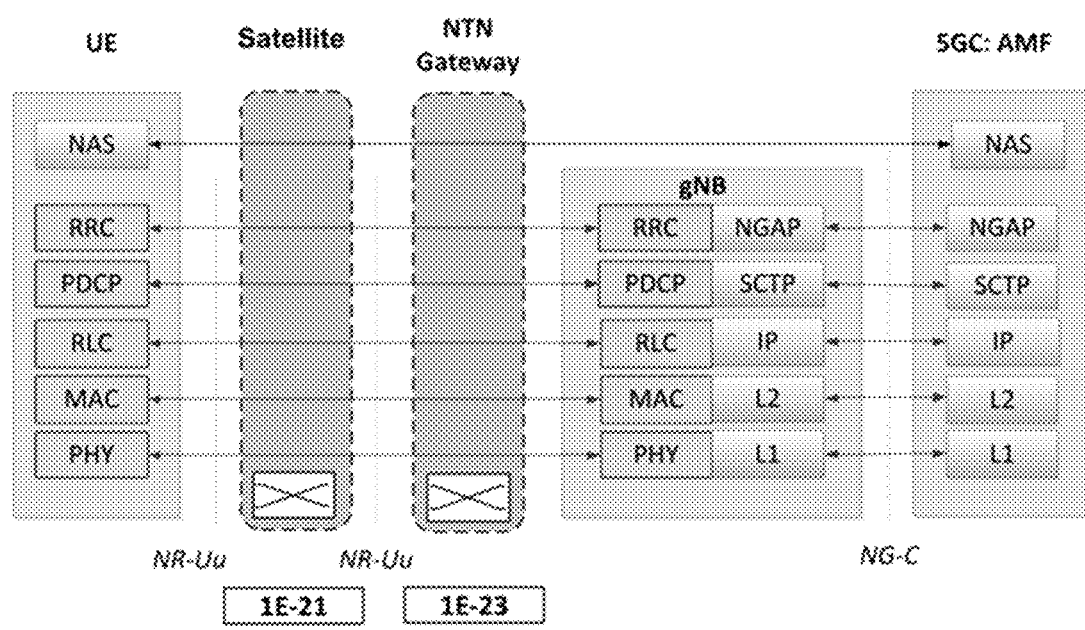

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between gNB and UE. Other protocols such as SDAP, PDCP, RLC, MAC, PHY, RRC, NAS are same as used in normal terrestrial network.

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between gNB and UE. Other protocols such as SDAP, PDCP, RLC, MAC, PHY, RRC, NAS are same as used in normal terrestrial network.

RRC reconfiguration is a procedure to change various configuration of a UE. RRC reconfiguration could be performed either in asynchronous manner or in synchronous manner.

In asynchronous reconfiguration, the new configuration information is provided by a RRC message (e.g. RRCSetup, RRCReconfiguration without ReconfigurationWithSync). UE applies the new configuration when the contents of the RRC message is successfully decoded. The base station applies the new configuration when the RRC message is considered successfully transmitted. Since UE and base station apply the new configuration at different point of time, it is considered as asynchronous reconfiguration.

In synchronous reconfiguration, random access procedure between UE and the base station is performed before the new configuration is applied. Upon successful completion of random access procedure, UE and base station applies the new configuration almost simultaneously.

Synchronous reconfiguration is applied for various procedure including handover. Since handover involve PCI change and layer 2 reset and security key change, the reconfiguration needs to be synchronized between the UE and the base station.

In NTN, a serving cell of many UEs can change even when those UEs do not move. For example, service link hard switch (e.g., serving satellite covering a geographical area changes) causes change of the serving satellite. However, the cell coverage of the satellites before and after switch could be identical.

In this scenario, network may use the same PCI and the same ARFCN for the cell served by the old satellite and for the cell served by the new satellite to avoid layer 2 reset and service interruption.

If the PCI/ARFCN of the cell remain same, and the main configuration (e.g. CSI report configuration, layer 2 bearer configuration, MAC configuration etc) remain same before and after hard switch, UE and the base station can apply more efficient reconfiguration procedure where operations on layer 2 protocol stacks and operations on layer 1 dedicate resource continue in the new cell.

In network point of view, even if the old satellite (and the old cell) and the new satellite (and the new cell) provide the same coverage for same UEs, admission control may allow only part of UEs to use the same configuration in the new cell. In this case, the base station may first determine which UE is subject to the new reconfiguration procedure and which UE is subject to the legacy reconfiguration procedure. Then GNB can instruct the UEs to perform appropriate reconfiguration procedure according to the determination.

In this disclosure, two types of synchronous reconfiguration are defined: Message Based Synchronous Reconfiguration (MBSR) and Time Based Synchronous Reconfiguration (TBSR).

MBSR is synchronous reconfiguration procedure that is triggered by a RRCReconfiguration containing ReconfigurationWithSync. MBSR is for conventional handover and conditional handover where main configuration changes upon reconfiguration.

TBSR is synchronous reconfiguration procedure that is triggered at a specific time point based on system information. TBSR is for simplified handover where main configuration remains same.

In this disclosure, RRCReconfiguration not containing Reconfiguration WithSync is called first RRCReconfiguration; RRCReconfiguration containing Reconfiguration WithSync is called second RRCReconfiguration.

In the following, information elements, fields, messages and procedures etc related to the disclosure are briefly explained.

An IE in a field may contain one or more child fields and child IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/upstream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

IE/fields containing child IE/child fields is a container.

In this disclosure, XXX_XXX and XxxXxx denotes an IE. xxx_xxx and xxxXxx denotes a field. xxx_XXX denotes a variable. XXX_xxx denotes a value indicated in xxx_xxx field. X denotes an upper character. x denotes an lower character.

In this disclosure, UE and Terminal and wireless device are used interchangeably. GNB and base station are used interchangeably.

L3-XXX-XXX means Layer 3 control message of XXX-XXX. L2-XXX-XXX means Layer 2 control message (or MAC CE) of XXX-XXX. L1-DCI-N-M means Layer 1 DCI format N_M.

RRCReconfiguration message is the command to modify an RRC connection. It may convey information for measurement configuration, mobility control, radio resource configuration (including RBs, MAC main configuration and physical channel configuration) and AS security configuration. RRCReconfiguration containing Reconfiguration Withsync is the command to perform handover.

RRCReconfiguration includes following fields:
>1: radioBearerConfig (parameters for PDCP and SDAP for one or more radio bearers);
>1: dedicatedSIB1-Delivery; This field is used to transfer SIB1 to the UE; UE applies this field after synchronous reconfiguration is completed.
>1: otherConfig
>1: spCellConfig (e.g. parameters for the target SpCell)
>>2: reconfiguration WithSync;
>>>3: spCellConfigCommon (e.g. ServingCellConfigCommon for target SpCell);
>>>3: newUE-Identity (C-RNTI to be used in the target SpCell);
>>>3: t304 (e.g., supervision timer for synchronous reconfiguration);
>>>3: rach-ConfigDedicated (e.g., dedicate random access parameters to be used for the reconfiguration with sync);
>>2: spCellConfigDedicated (e.g. ServingCellConfig for target SpCell);
the IE ServingCellConfigCommon is used to configure cell specific parameters of a UE's serving cell. The IE contains parameters which a UE would typically acquire from SSB, MIB or SIBs when accessing the cell from IDLE.

This IE contains following fields/IEs:
- >1: physCellId field includes information corresponding to an integer. This field identifies the physical cell identity (PCI) of the serving cell;
- >1: downlinkConfigCommon field includes common downlink configuration of the serving cell, including the frequency information configuration and the initial downlink BWP common configuration;
- >1: uplinkConfigCommon field contains common uplink configuration of the serving cell, including the frequency information configuration and the initial uplink BWP common configuration;
- >>2: absoluteFrequencySSB field includes ARFCN-ValueNR IE; This field indicates frequency of the SSB to be used for this serving cell. SSB related parameters (e.g. SSB index) provided for a serving cell refer to this SSB frequency;
- >>2: absoluteFrequencyPointA field includes ARFCN-ValueNR IE; This field indicates absolute frequency position of the reference resource block (Common RB 0) of which lowest subcarrier is also known as Point A;
- >1: n-TimingAdvanceOffset field indicates the N_TA-Offset to be applied for all uplink transmissions on this serving cell;
- >1: ntn-Config field includes a NTN-Config IE.

The IE ServingCellConfigCommonSIB is used to configure cell specific parameters of a UE's serving cell in SIB1. The ServingCellConfigCommonSIB contains downlinkConfigCommon field and uplinkConfigCommon field and n-TimingAdvanceOffset field as ServingCellConfigCommon IE does. The ServingCellConfigCommonSIB does not include physCellId field because PCI of the cell is acquired by the UE during PBCH decoding.

The IE ServingCellConfig is used to configure (add or modify) the UE with a serving cell, which may be the SpCell or an SCell of an MCG or SCG. The parameters herein are mostly UE.

This IE contains following fields/IEs
- >1: CSI-ReportConfig IE (e.g. parameters for CSI report);
- >1: one or more BWP-Downlink IEs (e.g. parameters for downlink BWP); The IE BWP-Downlink is used to configure an additional downlink bandwidth part;
- >1: one or more BWP-Uplink IEs (e.g. parameters for uplink BWP); The IE BWP-Uplink is used to configure an additional uplink bandwidth part; The IE BWP-Uplink contains following IEs/fields:
- >>2: one or more RACH-ConfigCommon (e.g. parameters for random access procedure common for one or more UEs);
- >>2: PUCCH-Config IE (e.g. parameters for PUCCH);
- >>2: SRS-Config IE (e.g. parameters for SRS);
- >>2: BeamFailureRecoveryConfig RadioBearerConfig is used to add, modify and release signalling, multicast MRBs and/or data radio bearers.

RadioBearerConfig contains at least following IEs:
- >1: Zero or more SRB-ToAddMod (parameters for SRB configuration) IEs; Each of SRB-ToAddMod IE includes following fields/IEs for a SRB:
- >>2: srb-Identity field; this field includes an information corresponding to a specific integer; the integer is the identifier of the SRB;
- >>2: reestablishPDCP field; this field includes an enumerated value indicating 'true';
- >>2: discardOnPDCP field: this field includes an enumerated value indicating 'trune';
- >>2: pdcp-Config field: this field includes PDCP-Config IE (e.g., configurable PDCP parameters);
- >1: Zero or more DRB-ToAddMod (parameters for DRB configuration) IEs; Each of DRB-ToAddMod IE includes following fields/IEs for a DRB:
- >>2: drb-Identity field; this field includes an information corresponding to a specific integer; the integer is the identifier of the DRB;
- >>2: reestablishPDCP field; this field includes an enumerated value indicating 'true';
- >>2: recoverPDCP field: this field includes an enumerated value indicating 'trune';
- >>2: pdcp-Config field: this field includes PDCP-Config IE (e.g., configurable PDCP parameters);

reestablishPDCP field indicates that PDCP should be re-established. Network sets this to true whenever the security key used for this radio bearer changes. If this field is included for a DRB or for a SRB, UE performs PDCP entity re-establishment procedure. In PDCP entity re-establishment procedure, UE initializes PDCP variables and changes the security keys and performs retransmission or transmission of stored PDCP SDUs after header compression.

recoverPDCP field indicates that PDCP should perform recovery. If this field is included for a DRB, UE performs retransmission of all the PDCP Data PDUs previously submitted to re-established or released AM RLC entities in ascending order of the associated COUNT values for which the successful delivery has not been confirmed by lower layers.

discardOnPDCP field indicates that PDCP should discard stored SDU and PDU. If this field is included for a SRB, UE discards all stored PDCP SDUs and PDCP PDUs of the SRB.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included.

This IE includes following fields/IEs:
- >1: carrier field indicates in which serving cell the CSI-ResourceConfig indicated below are to be found. If the field is absent, the resources are on the same serving cell as this report configuration.
- >1: reportConfigType field indicates time domain behavior of reporting configuration. This field includes following IEs
- >>2: one or more PUCCH-CSI-Resource; each PUCCH-CSI-Resource IE indicates PUCCH resource to be used for CSI reporting;
- >1: reportQuantity field indicates the CSI related quantities to report.
- >1: reportSlotConfig indicates periodicity and slot offset
- >1: resourcesForChannelMeasurement field contains a CSI-ResourceConfigId. This field indicates resources for channel measurement. csi-ResourceConfigId of a CSI-ResourceConfig included in the configuration of the serving cell indicated with the field "carrier" above.

The IE SchedulingRequestResourceConfig determines physical layer resources on PUCCH where the UE may send the dedicated scheduling request. This IE includes information on periodicity and offset and information on PUCCH resource.

The IE PUCCH-Config is used to configure UE specific PUCCH parameters (per BWP). This IE includes one or more PUCCH resource. Each of one or more PUCCH resource includes information on frequency resource for the PUCCH resource (e.g. startingPRB) and time resource for the PUCCH resource (e.g. nrofSymbols, startingSymbolIndex).

The IE SRS-Config is used to configure sounding reference signal transmissions. The configuration defines a list of SRS-Resources, a list of SRS-PosResources, a list of SRS-PosResourceSets and a list of SRS-ResourceSets. Each resource set defines a set of SRS-Resources or SRS-PosResources.

The IE RACH-ConfigCommon is used to specify the cell specific random-access parameters.

This IE contains followings:
>1: parameters for PRACH occasions;
>1: parameters for preambles;
>1: parameters for random access response;
>1: parameters for contention resolution;
>1: parameters for power control (for preamble transmission power and Msg3 transmission power);
The IE RACH-ConfigDedicated is used to specify the dedicated random access parameters.
>1: parameters for PRACH occasions for dedicate usage;
>1: parameters for preamble for dedicate usage.
ReconfigurationWithSync IE contains various parameters related to synchronous reconfiguration. It includes:
>1: cell specific serving cell configuration for the target SpCell;
>>2: common RACH configuration to be applied in the target SpCell.
>1: dedicate RACH occasions and preamble to be applied to the random access procedure triggered for synchronous reconfiguration.

System information is broadcasted in a cell periodically. System information contains various information required for UEs in the cell to perform various activities.

System Information (SI) consists of a MIB and a number of SIBs, which are divided into Minimum SI and Other SI:

MIB contains cell barred status information and essential physical layer information of the cell required to receive further system information, e.g. CORESET #0 configuration. MIB is periodically broadcast on BCH.

SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

SIB2 and SIB3 and SIB4 and SIB5 contain information for mobility (e.g. information on serving frequency and neighbouring cells).

SIB6 and SIB7 contain ETWS notifications;

SIB10 and SIB11 and SIB16 and SIB17 contain various information applicable for specific UEs such as Human-Readable Network Names (HRNN) of the NPNs and information related to idle/inactive measurements and information related to disaster roaming etc.

SIB19 contains a NTN-specific parameter. More specifically, SIB19 contains t-service field and t-stop field and t-start field and a ntn-Config field and a ntn-Config2 field. ntn-Config field contains parameters needed for the UE to access NR via NTN access until a specific time point (e.g. t-Service or t-stop). ntn-Config field includes a NTN-Config IE.

ntn-Config2 field contains parameters needed for the UE to access NR via NTN access after a specific time point (e.g. t-start). ntn-Config2 field includes a NTN-Config IE.

absoluteFrequencySSB of cell where ntn-Config is applied and absoluteFrequencySSB of cell where ntn-Config2 is applied are same.

absoluteFrequencyPointA of cell where ntn-Config is applied and absoluteFrequencyPointA of cell where ntn-Config2 is applied are same.

PCI of cell where ntn-Config is applied and PCI of cell where ntn-Config2 is applied are same.

t-Service field indicates the time information on when a cell provided via NTN quasi-Earth fixed system is going to stop serving the area it is currently covering. The field indicates a time in multiples of 10 ms after 00:00:00 on Gregorian calendar date 1 Jan. 1900 (midnight between Sunday, Dec. 31, 1899 and Monday, Jan. 1, 1900). The exact stop time is between the time indicated by the value of this field minus 1 and the time indicated by the value of this field.

t-stop indicates the exact time on when a cell provided by a current satellite is going to stop serving the area it is currently covering. The field indicates a subframe number and a SFN. Alternatively, the field indicates a time in multiple of 1 ms after the time indicated by the t-Service minus 1 (e.g., the value 0 of t-stop corresponds to the time indicated by t-Service minus 1).

t-start indicates the time information on when a cell provided by another satellite different from the current satellite in NTN quasi-Earth fixed system is going to start serving the area currently covered by the current satellite. The field indicates a time in multiples of 1 ms. The exact stop time is after the time indicated by the t-stop (e.g., the value 0 of t-start corresponds to the time indicated by t-stop).

T-stop is the time point when the old satellite stops service on the geographical area covered by the current serving cell.

T-start is the time point when the new satellite starts service on the geographical area covered by the current serving cell.

The IE NTN-Config provides parameters needed for the UE to access NR via NTN access.
>1: EphemerisInfo:
>>2: This field provides satellite ephemeris either in format of position and velocity state vector or in format of orbital parameters.
>1: epochTime:
>>2: this field indicate the epoch time for the NTN assistance information. When explicitly provided through SIB, or through dedicated signalling, the EpochTime is the starting time of a DL sub-frame, indicated by a SFN and a sub-frame number signalled together with the assistance information. For serving cell, the field sfn indicates the current SFN or the next upcoming SFN after the frame where the message indicating the epochTime is received;
>>2: This field comprises an integer indicating a SFN and a integer indicating subframe number;
>>2: For epochTime in ntn-config field, UE uses SFN determined before t-stop (e.g. current SFN when ntn-config is received);
>>2: For epochTime in ntn-config2 field, UE uses SFN determined after t-start (e.g. SFN determined based on MIB that are reacquired after t-start);
>1: cellSpecificKoffset:
>>2: This field indicates scheduling offset used for the timing relationships that are modified for. The unit of the field K_offset is number of slots for a given subcarrier spacing of 15 kHz. If the field is absent UE assumes value 0.

>1: kmac:
>>2: This field indicates scheduling offset provided by network if downlink and uplink frame timing are not aligned at gNB. For the reference subcarrier spacing value for the unit of K_mac in FR1, a value of 15 kHz is used. The unit of K_mac is number of slots for a given subcarrier spacing.
>1: ntn-PolarizationDL:
>>2: If present, this parameter indicates polarization information for downlink transmission on service link: including Right hand, Left hand circular polarizations (RHCP, LHCP) and Linear polarization.
>1: ntn-PolarizationUL:
>>2: If present, this parameter indicates Polarization information for uplink service link. If not present and ntn-PolarizationDL is present, UE assumes the same polarization for UL and DL.
>1: ntn-UISyncValidityDuration:
>>2: This field indicates a validity duration configured by the network for assistance information (i.e. Serving and/or neighbour satellite ephemeris and Common TA parameters) which indicates the maximum time duration (from epochTime) during which the UE can apply assistance information without having acquired new assistance information. The unit of ntn-UISyncValidityDuration is second. Value s5 corresponds to 5 s, value s10 indicate 10 s and so on.
>1: ta-Common:
>>2: This field indicates network-controlled common timing advanced value and it may include any timing offset considered necessary by the network. ta-Common with value of 0 is supported. The granularity of ta-Common is $4.072 \times 10^{-3}$ μs. Values are given in unit of corresponding granularity.
>1: ta-CommonDrift:
>>2: This field indicate drift rate of the common TA. The granularity of ta-CommonDrift is $0.2 \times 10^{-3}$ μs/s. Values are given in unit of corresponding granularity.
>1: ta-CommonDrift Variant:
>>2: This field indicate drift rate variation of the common TA. The granularity of ta-CommonDriftVariant is $0.2 \times 10^{-4}$ μs/s$^2$. Values are given in unit of corresponding granularity.
>1: ta-Report:
>>2: This field includes a value enumerated with 'enabled';
>>2: When this field is included in ntn-Config in SIB19, it indicates reporting of timing advanced is enabled during Random Access due to RRC connection establishment or RRC connection resume, and during RRC connection reestablishment. When this field is included in ServingCellConfigCommon within dedicated signalling, it indicates TA reporting is enabled during Random Access due to reconfiguration with sync (e.g. MBSR). When this field is included in ntn-Config2 in SIB19, it indicates reporting of timing advanced is enabled during Random Access due to TBSR.

Uplink frame number for transmission from the UE shall start $T\_TA=(N\_TA+N\_TA\_offset+N\_TA\_adj\_common+N\_TA\_adj\_UE) T\_c$ before the start of the corresponding downlink frame at the UE where:
>1: N_TA is 0 for preamble transmission; N_TA is indicated and updated by Timing Advance Command;
>1: N_TA_offset is indicated by n-TimingAdvanceOffset field;
>1: N_TA_adj_common is derived from ta-Common and ta-CommonDrift and ta-CommonDrift Variant;
>1: N_TA_adj_UE is computed by the UE based on UE position and serving satellite ephemeris related parameters.

Figure 1F:
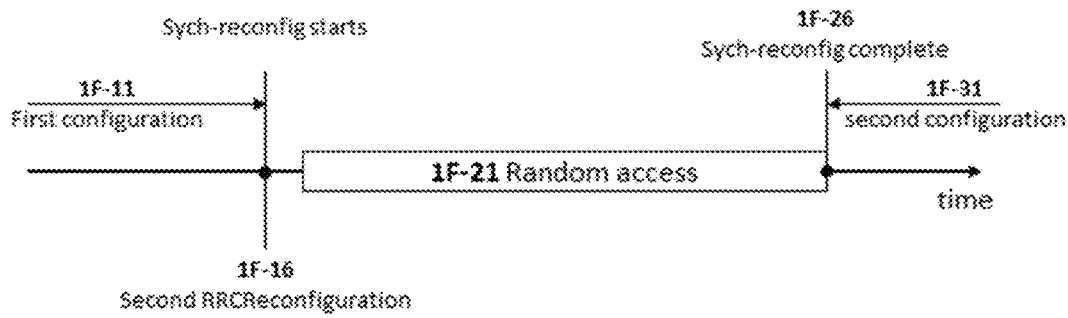
FIG. 1F is a diagram illustrating various synchronous reconfigurations.
Figure 1F:
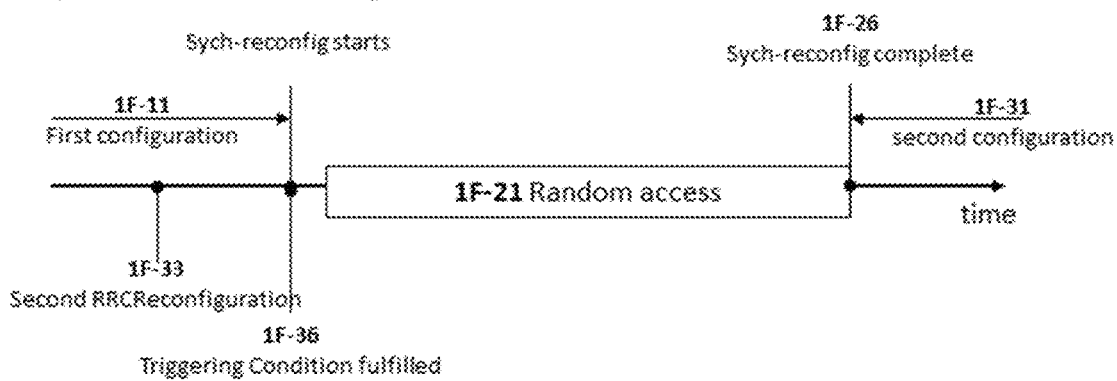
Figure 1F:
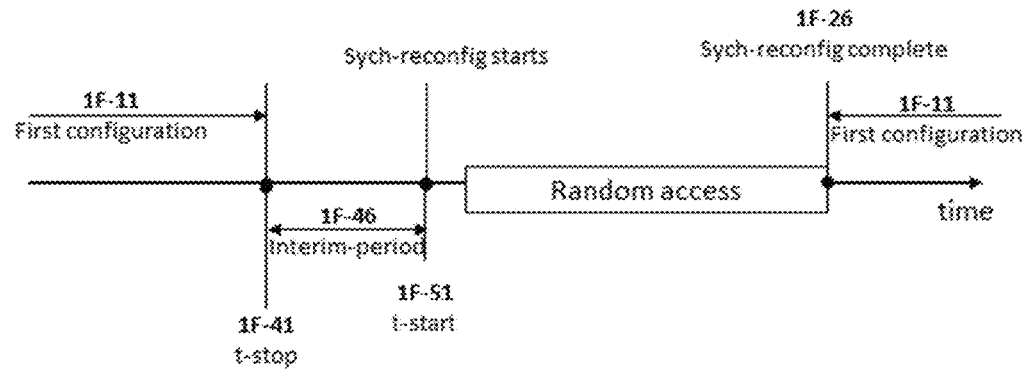

FIG. 1F illustrates the MBSR and TBSR.

The first type MBSR is the procedure where HO command (e.g. second RRCReconfiguration) takes the effect immediately when the HO command is received.

The second type MBSR is the procedure where HO command takes the effect when certain conditions specified in the HO command are fulfilled.

The TBSR is the procedure where synchronous reconfiguration occurs at a specific time point. The specific time point is not indicated by second RRCReconfiguration. The specific time point can be indicated by a RRC message or by a system information.

In the first type MBSR procedure, the UE may:
>1: apply the first configuration in a first SpCell 1F-11 until a second RRCReconfiguration is received;
>>2: The second RRCReconfiguration 1F-16 includes a Reconfiguration WithSync;
>1: performs random access procedure in a second SpCell 1F-21 based on:
>>2: RACH-ConfigCommon in the second RRCReconfiguration; and
>>2: RACH-ConfigDedicated in Reconfiguration WithSync;
>1: apply the second configuration in the second SpCell 1F-31 after completion of the synchronous reconfiguration procedure 1F-26;
>>2: The second configuration is indicated in the second RRCReconfiguration;
>>2: The synchronous reconfiguration procedure is completed when the random access procedure triggered for the synchronous reconfiguration procedure is completed. In the second type MBSR procedure, the UE may:
>1: apply the first configuration 1F-11 in a first SpCell until triggering conditions are fulfilled 1F-36;
>>2: The second RRCReconfiguration 1F-33 includes a Reconfiguration WithSync and information on triggering conditions;
>1: performs random access procedure 1F-21 in a second SpCell based on:
>>2: RACH-ConfigCommon in the second RRCReconfiguration; and
>>2: RACH-ConfigDedicated in the Reconfiguration WithSync;
>1: apply the second configuration in the second SpCell 1F-31 after completion of the synchronous reconfiguration procedure 1F-26;
>>2: The second configuration is indicated in the second RRCReconfiguration;
>>2: The synchronous reconfiguration procedure is completed when the random access procedure triggered for the synchronous reconfiguration procedure is completed.

In TBSR procedure, the UE may:
>1: apply the first configuration 1F-11 in a first SpCell until t-stop 1F-41;
>1: apply interim-period 1F-46 from t-stop 1F-41 to t-start 1F-51;
>1: perform random access procedure 1F-21 in a second SpCell based on:
>>2: RACH-ConfigCommon in system information received in the first SpCell (or RACH-ConfigCommon in the RRCSetup); and >>2: PDCCH order received in the first SpCell before t-stop;
>1: apply the first configuration 1F-11 in the second SpCell after completion of the synchronous reconfiguration procedure 1F-26;
>>2: The first configuration is indicated in the first RRCReconfiguration and in the RRCSetup;
>>2: The synchronous reconfiguration procedure is completed when the random access procedure triggered for the synchronous reconfiguration procedure is completed.

In MBSR, UE transmits, in the second SpCell at the first PUSCH transmission, MAC PDU containing a RRC message (e.g., RRCReconfigurationComplete) and a MAC CE on a second C-RNTI (e.g., C-RNTI MAC CE).

In TBSR, UE transmits, in the second SpCell at the first PUSCH transmission, two or more MAC CEs: a MAC CE on a first C-RNTI (e.g., C-RNTI MAC CE) and a MAC CE for Timing Advance Report and a MAC CE for BSR (if uplink resource can accommodate the MAC CE for BSR).

The source cell and the target cell may have different PCIs and carrier frequencies in MBSR.

The source cell and the target cell have the same PCI and the same carrier frequency in TBSR.

Figure 2:
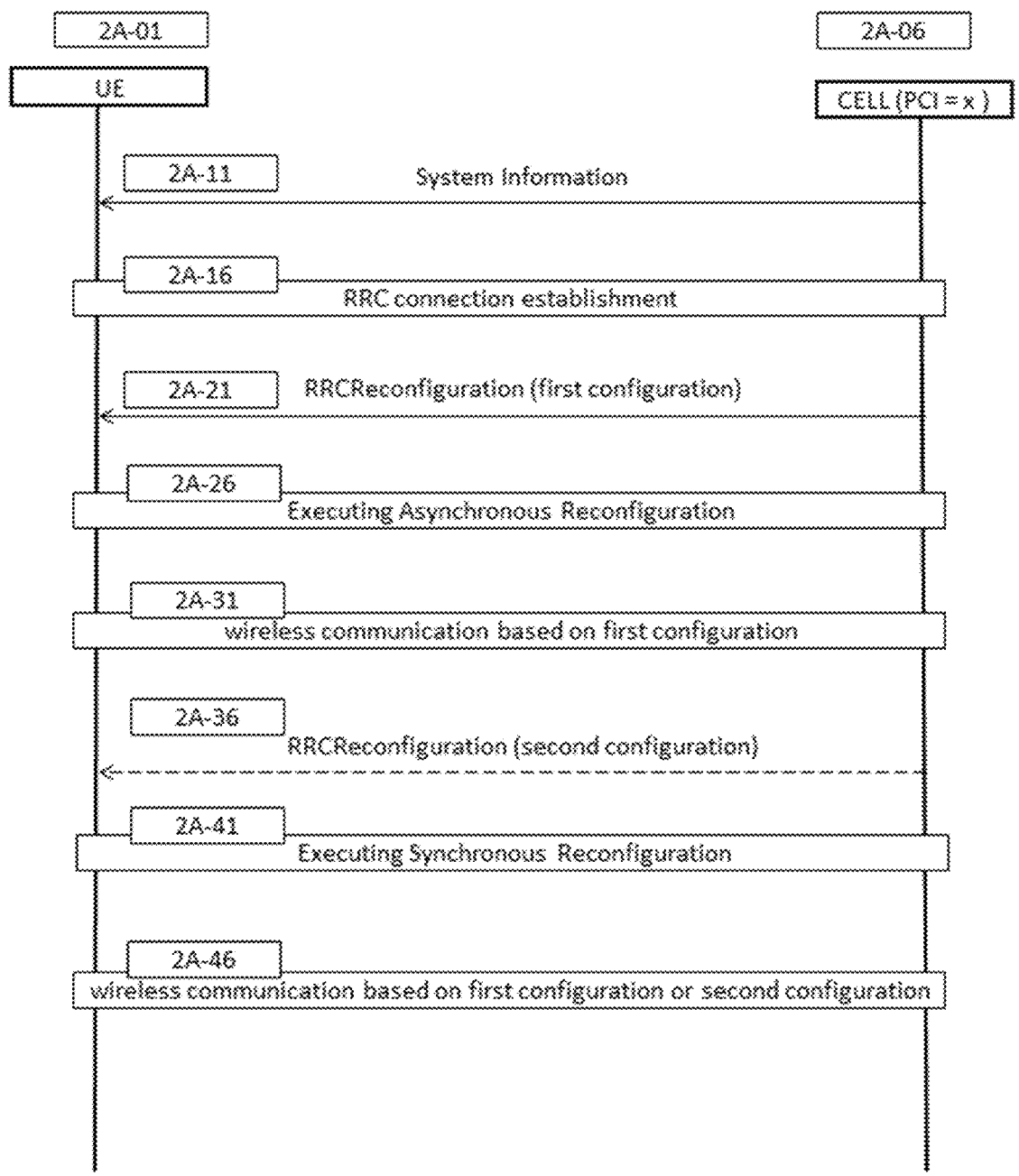
FIG. 2 is a diagram illustrating operations of a terminal and a base station according to an embodiment of the present invention.

FIG. 2 illustrates the operation of UE and base station.

A UE 2A-01 is camping on a CELL1 2A-06. The CELL 1 is served by a satellite 1. PCI x is applied to the CELL 1.

At 2A-11, UE receives system information in the CELL 1. The system information includes ServingCellConfigCommonSIB to be applied by the UE in the CELL 1.

At 2A-16, UE performs RRC connection establishment procedure with a base station. UE and the base station establish SRB1 during the RRC connection establishment procedure. The CELL 1 becomes SpCell of the UE after RRC connection establishment procedure.

In the RRC connection establishment procedure, UE receives from the base station a RRCSetup. The RRCSetup includes ServingCellConfig to be applied by the UE in the CELL1. The RRRCSetup includes RadioBearerConfig for SRB1.

After SRB 1 establishment, UE may report its capability to the base station. The base station may decide the configuration to be applied to the UE based on the UE capability and traffic load status and traffic requirement. UE may report in which frequency band it supports TBSR.

At 2A-21, The base station transmits a first RRCReconfiguration to the UE. The first RRCReconfiguration may include following IEs/fields:
>1: ServingCellConfig (or one or more fields contained in the IE); this IE, if included, replaces ServingCellConfig (or one or more field contained in the IE) received in RRCSetup;
>1: RadioBearerConfig; UE and base station establishes SRB2 and SRB4 based on this IE;
>1: MeasConfig;

At 2A-26, UE and the base station perform/execute asynchronous reconfiguration procedure based on the configuration information included in the first RRCReconfiguration.

UE and base station determine to perform asynchronous reconfiguration procedure if the corresponding RRCReconfiguration does not include Reconfiguration WithSync IE.

UE applies the configuration information in the first RRCReconfiguration at time_point_1 and the base station applies the configuration information at time_point_2. The time_point_1 is when UE decodes the configuration information. The time_point_2 is when the base station consider transmission of the RRCReconfiguration containing the configuration information is successful (e.g. when HARQ ACK for the RRCReconfiguration is received).

After completion of the asynchronous reconfiguration procedure, UE and the base station perform wireless communication based on the following configuration at 2A-31.
>1: ServingCellConfigCommonSIB received in the SIB1 of the CELL1 (if ServingCellConfigCommon is not provided in RRCSetup) or ServingCellConfigCommon in RRCSetup;
>1: ServingCellConfig received in the RRCSetup (if the first RRCReconfgiration does not include ServingCellConfig) or in the first RRCReconfiguration (if the first RRCReconfiguration includes ServingCellConfig);
>1: RadioBearConfig received in the first RRCReconfiguration or in the RRCSetup; UE performs following operation based on ServingCellConfigCommonSIB received in the SIB1 of the CELL1:
>1: initial BWP determination based on downlinkConfigCommon and uplinkConfigCommon;
>1: contention based random access procedure in the initial BWP based on RACH-ConfigCommon;
>1: uplink timing alignment based on n-TimingAdvanceOffset;
UE performs following operations based on ServingCellConfig received in the RRCSetup or in the first RRCReconfiguration:
>1: BWP switching based on one or more BWP configuration information;
>1: CSI reporting based on CSI-ReportConfig;
>1: Scheduling Request based on SchedulingRequestResourceConfig;
>1: SRS transmission based on SRS-Config;
>1: TimeAlignmentTImer maintenance (e.g. setting the value of the timer) based on timeAlignmentTimer field for TAG 0
UE performs following operations based on RadioBearConfig received in the first RRCReconfiguration:
>1: RRC message transmission and reception via SRB1 based on SRBToAddMod in RRCSetup;
>1: RRC message transmission and reception via SRB2 and or SRB4 based on SRBToAddMod IEs in the first RRCReconfiguration;
>1: IP packet transmission and reception via DRBs based on DRBToAddMod IEs in the first RRCReconfiguration.

When service link switch is pending, base station prepares to reconfigure UEs in a cell served by the first satellite to the cell served by the second satellite.

There are three ways to do it; either via first type message based synchronous reconfiguration (MBSR) or via second type MBSR or via time based synchronous reconfiguration (TBSR).

If the base station determines to apply UE first type MBSR or second type MBSR, the base station transmits UE a second RRCReconfiguration at 2A-36.

The second RRCReconfiguration includes a Reconfiguration WithSync and a ServingCellConfig.

If the base station determines to apply UE TBSR, the base station does not transmit UE the second RRCReconfiugration. The base station operates based on the assumption that those UEs will perform TBSR based on the information indicated in the system information.

At 2A-41, UE and the base station perform/execute synchronous reconfiguration. The synchronous reconfiguration could be either first type MBSR or second type MBSR or TBSR.

After completion of the synchronous reconfiguration procedure, UE and the base station perform wireless communication based on the first configuration (in case of TBSR) or second configuration (in case of MBSR) in CELL2 at 2A-46.

First configuration information is as below:
>1: ServingCellConfigCommonSIB received in the SIB1 of the CELL1 or ServingCellConfigCommon received in RRCSetup;
>>2: The ServingCellConfigCommonSIB is received before t-stop (or alternatively the ServingCellConfigCommonSIB is reacquired after t-start);
>1: ServingCellConfig received in the RRCSetup (if the first RRCReconfgiration does not include ServingCellConfig) or in the first RRCReconfiguration (if the first RRCReconfiguration includes ServingCellConfig);
>>2: The RRCSetup or the first RRCReconfiguration is received in the CELL1 before t-stop;
>1: RadioBearConfig received in the RRCSetup and in the first RRCReconfiguration;
>>2: RadioBearerConfig in the RRCSetup contains SRBToAddMod for SRB1;
>>2: RadioBearerConfig in the first RRCReconfiguration contains SRBToAddMods for SRB2 and SRB4 and DRBToAddMod for DRBs; Second configuration information is as below:
>1: ServingCellConfigCommon received in ReconfigurationWithSync in the second RRCReconfiguration;
>1: ServingCellConfig received in the second RRCReconfiguration;
>1: RadioBearConfig received in the second RRCReconfiguration; UE performs followings before/during/after MBSR.

Upon reception of second RRCReconfiguration, UE may:
start timer T304;
stop PDCCH monitoring;
start synchronising to the DL of the cell indicated in Reconfiguration WithSync;
initialize Bj for each logical channel to zero;
stop (if running) all timers;
consider timeAlignmentTimers as expired;
perform TAT_expire_operation_1;
set the NDIs for all uplink HARQ processes to the value 0;
stop, if any, ongoing Random Access procedure;
discard explicitly signalled contention-free Random Access Resources for 4-step RA type and 2-step RA type, if any;
flush Msg3 buffer;
flush MSGA buffer;
cancel, if any, triggered Scheduling Request procedure;
cancel, if any, triggered Buffer Status Reporting procedure;
cancel, if any, triggered Power Headroom Reporting procedure;
cancel, if any, triggered consistent LBT failure;
cancel, if any, triggered BFR;
cancel, if any, triggered Timing Advance Reporting procedure;
cancel, if any, triggered Recommended bit rate query procedure;
cancel, if any, triggered Configured uplink grant confirmation;
cancel, if any, triggered Positioning Measurement Gap Activation/Deactivation Request procedure;
flush the soft buffers for all DL HARQ processes, except for the DL HARQ process being used for MBS broadcast;
for each DL HARQ process, except for the DL HARQ process being used for MBS broadcast, consider the next received transmission for a TB as the very first transmission;
reset all BFI_COUNTERS;
apply the value of the newUE-Identity as the C-RNTI;
configure lower layers in accordance with the received spCellConfigCommon in Reconfiguration WithSync;
indicate TA report initiation to lower layer if ta-Report is configured with value enabled in ServingCellConfigCommon in ReconfigurationWithSync;
initiate random access procedure based on Reconfiguration WithSync;
stop T304 when random access procedure is successfully completed;
apply, based on the configuration in Reconfiguration WithSync, the parts of the CSI reporting configuration, the scheduling request configuration and the sounding RS configuration that do not require the UE to know the SFN of the respective target SpCell;
apply, based on the configuration in ReconfigurationWithSync, the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell.

UE performs followings before/during/after TBSR.
when t-start arrives, UE may:
start timer T304 indicated in a specific system information;
start synchronizing to the DL of the cell indicated in the specific system information (or start resynchronizing to the DL of the current cell);
stop (if running) all timers;
consider timeAlignmentTimers as expired;
perform TAT_expire_operation_2;
stop, if any, ongoing Random Access procedure;
discard explicitly signalled contention-free Random Access Resources for 4-step RA type and 2-step RA type, if any;
flush Msg3 buffer;
flush MSGA buffer;
cancel, if any, triggered Power Headroom Reporting procedure;
cancel, if any, triggered BFR;
cancel, if any, triggered Timing Advance Reporting procedure;
reset all BFI_COUNTERS;
configure lower layers in accordance with ServingCellConfigCommon in the specific system information;
indicate TA report initiation to lower layer if ta-Report is configured with value enabled in the specific system information;
initiate random access procedure based on the specific system information;
stop T304 when random access procedure is successfully completed;
apply, based on the configuration in ServingCellConfig in RRCReconfiguration without ReconfigurationWithSync, the parts of the CSI reporting configuration, the scheduling request configuration and the sounding RS configuration that do not require the UE to know the SFN;

apply, based on the configuration in ServingCellConfig in RRCReconfiguration without ReconfigurationWithSync, the parts of the measurement and the radio resource configuration that require the UE to know the SFN (e.g. measurement gaps, periodic CQI reporting, scheduling request configuration, sounding RS configuration), if any, upon re-acquiring the SFN;

UE performs followings for TBSR. UE may:

>1: receive a MIB in a first cell based on the first ARFCN of a first cell;

>1: determine SFNs of the first cell based on the MIB;

>1: receive SIB1 and a first system information in the first cell;

>>2: The first system information includes a first NTN-Config and a second NTN-Config;

>>2: The SIB1 includes a RACH-ConfigCommon;

>1: receive the first system information in the first cell periodically;

>>2: the time points when UE receives the first system information next time is determined based on epochTime and ntn-UISyncValidityDuration in the first NTN-Config of the first system information most recently received;

>1: perform uplink transmission in the first cell based on the first NTN-Config and the second ARFCN until t-stop;

>1: initiate synchronous reconfiguration towards a second cell at a time point determined from a t-start;

>1: receive a MIB of the second cell based on the PCI of the second cell and the first ARFCN of the second cell;

>1: determine SFNs of the second cell based on the received MIB;

>1: perform uplink transmission in the second cell during a first period based on:

>>2: the second NTN-Config in the first system information and the second ARFCN of the second cell;

>1: performs uplink transmission in the second cell during a second period based on:

>>2: the first NTN-Config in the second system information and the second ARFCN of the second cell;

Followings are applied:

>1: The first period is the period while system information containing the first NTN-Config is not received yet after synchronous reconfiguration; The first period is between t-start and the time point when the second system information is received first time in the second cell;

>1: The second period is the period while system information containing the first NTN-Config is available after synchronous reconfiguration; The second period is between the time point when the second system information is received first time in the second cell and the time point another synchronous reconfiguration occurs;

>1: the first period is between the third time point (t-start) and the time point the second system information is acquired first time in the second cell since t-start;

>1: The first NTN-Config in the first system information and the second NTN-Config in the second system information and the first NTN-Config in the second system information and the second NTN-Config in the second system information are implicitly associated with a same PCI and a same carrier frequency (e.g. ARFCN);

>>2: A NTN-Config being associated with a PCI and a carrier frequency may mean that the NTN-Config is applied to uplink transmissions and scheduling based on the PCI and the carrier frequency.

>>2: A NTN-Config being implicitly associated with a PCI and a carrier frequency mean that the PCI and the carrier frequency are not explicitly indicated in the NTN-Config;

>>2: In the disclosure, NTN-Config and NTN configuration are used interchangeably.

>1: The first cell is associated with PCI x and a first ARFCN y and a second ARFCN z;

>>2: the first ARFCN indicates frequency of SSB of the first cell;

>>2: the second ARFCN indicates absolute frequency position of the reference resource block of the first cell;

>1: The second cell is associated with PCI x and a first ARFCN y and a second ARFCN z;

>>2: the first ARFCN indicates frequency of SSB of the second cell;

>>2: the second ARFCN indicates absolute frequency position of the reference resource block of the second cell;

UE determines uplink transmission timing based on system information.

UE may:

>1: determine T_TA (e.g. total amount of timing advance) during a period_1 based on:

>>2: Timing Advance Command received before t-stop;

>>2: a constant offset indicated in n-TimingAdvanceOffset (e.g. a value for constant offset) in SIB1 received during a period_1 (or before t-start or before t-stop or before t-service);

>>>3: the constant offset remains constant until new constant offset is provided;

>>2: a variable offset derived from ta-Common and ta-CommonDrift and ta-CommonDrift Variant and EphemerisInfo in the first NTN configuration received during the period_1 (or before t-start or before t-stop or before t-service) and UE location estimated by the UE;

>>>3: the variable offset is continuously updated based on the location of the UE and the location of satellite (estimated based on EphemerisInfo in the above first NTN configuration);

>1: determines T_TA during a period_2 based on:

>>2: Timing Advance Command received after t-start;

>>2: a constant offset indicated in n-TimingAdvanceOffset (e.g. a value for constant offset) in SIB1 received during a period_1 (or before t-start or before t-stop or before t-service);

>>>3: the constant offset remains constant until new constant offset is provided;

>>2: a variable offset derived from ta-Common and ta-CommonDrift and ta-CommonDriftVariant and EphemerisInfo in the second NTN configuration during the period_1 (or before t-start or before t-stop or before t-service) and UE location estimated by the UE;

>>>3: the variable offset is continuously updated based on the location of the UE and the location of satellite (estimated based on EphemerisInfo in the above second NTN configuration);

>1: determine T_TA during period_3 based on:

>>2: Timing Advance Command received after t-start (e.g. Timing Advance Command received during the period_2 and the period_3);

>>2: a constant offset indicated in n-TimingAdvanceOffset (e.g. a value for constant offset) in SIB1 received during period_2 or a period_3 (or after t-start);

>>>3: the constant offset remains constant until new constant offset is provided;
>>2: a variable offset derived from ta-Common and ta-CommonDrift and ta-CommonDriftVariant and EphemerisInfo in the first NTN configuration received during period_3 (or after t-start) and UE location estimated by the UE;
>>>3: the variable offset is continuously updated based on the location of the UE and the location of satellite (estimated based on EphemerisInfo in the above first NTN configuration);

The period_1 is the time duration while the first system information is available and before synchronous reconfiguration is initiated. The first period is after the first system information is received first time and before t-stop.

The period_2 is the time duration while the second system information is not available yet and after the synchronous reconfiguration is initiated. The second period is after t-start and before the second system information is received in the second cell first time.

The period_3 is the time duration while the second system information is available and after the synchronous reconfiguration is initiated. The third period is after the second system information is received in the second cell first time and before another synchronous reconfiguration is initiated.

The first system information is the system information containing NTN specific parameters for the first cell. The second system information is the system information containing NTN specific parameters for the second cell.
>1: The first system information includes:
>>2: first NTN-Config and second NTN-Config and a t-Service and a t-start and a t-stop;
>1: The second system information includes:
>>2: first NTN-Config and second NTN-Config and a t-Service and a t-start and a t-stop;
>1: The cell where the first system information is received and the cell where the second system information is received have same PCI and same ARFCN for SSB;
>1: The first system information is received before t-stop;
>1: The second system information is received after t-start;
>1: The first cell and the second cell are associated with the same PCI and the same first ARFCN and the same second ARFCN.

UE may use first NTN configuration and second NTN configuration in determining uplink transmission timing and time domain position of scheduled resource (e.g. HARQ feedback resource).

UE may use only valid NTN configurations. The validity of NTN configurations is determined based on various time information indicated in various system information.

Figure 3:
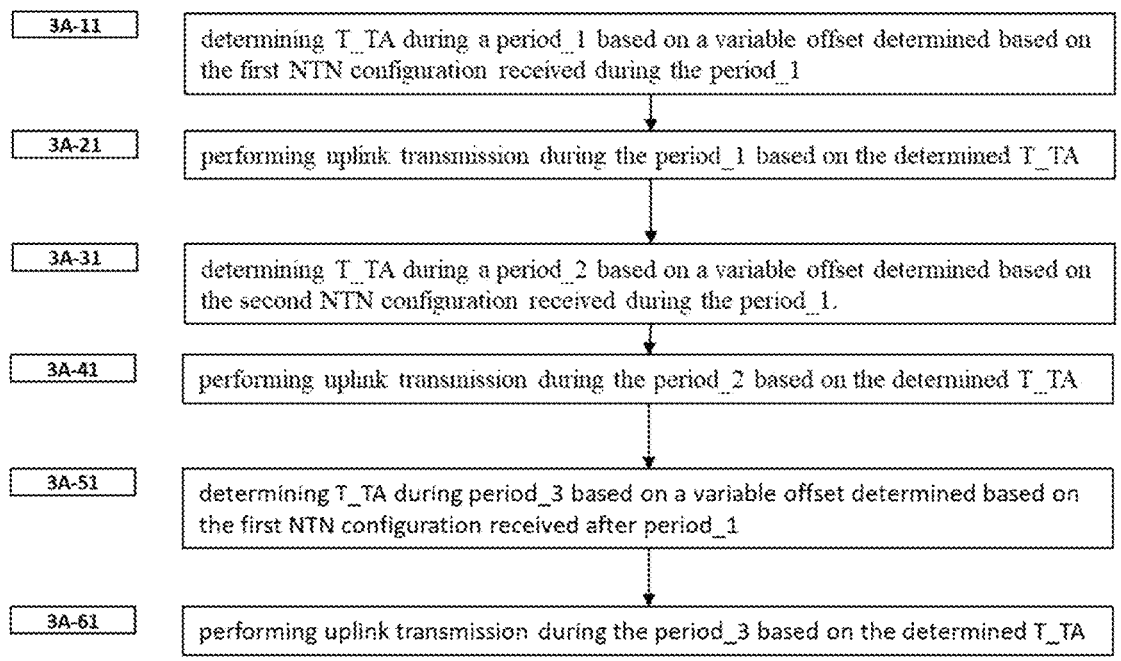
FIG. 3 is a flow diagram illustrating an operation of a terminal.

UE may perform system information acquisition to receive valid NTN configuration before current NTN configuration becomes invalid.
>1: The UE may:
>>2: receive MIB at t1 based on a first PCI and a first ARFCN;
>>2: determines SFN based on the MIB;
>>2: receive a first NTN configuration in first SIB19;
>>2: start T430 for serving cell with the timer value set to the first ntn-UISyncValidityDuration (in the first SIB19) from the SFN and subframe indicated by the first epochTime (in the first SIB19);
>>>3: the SFN indicated by the first epochTime is determined from the MIB received at t1;
>>>3: PCI of the serving cell is indicated by SSB; carrier frequency of the serving cell is indicated by SIB1 (or carrier frequency of the serving cell is determined from the frequency of the SSB);
>>>3: PCI of the serving cell is first PCI and carrier frequency of the serving cell is first ARFCN;
>>2: consider first NTN configuration (in the first SIB19) for the serving cell valid while T430 is running;
>>2: performs uplink transmission based on the first NTN configuration (in the first SIB19) while T430 is running;
>>2: re-acquire the first SIB19 before T430 expires;
>>2: start T430 for serving cell with the timer value set to the first ntn-UISyncValidityDuration (in the first SIB19) from the SFN and subframe indicated by the first epochTime (in the first SIB19);
>>2: at t-stop (or t-service):
>>>3: stop uplink transmission and consider T430 expired (or stop T430);
>>2: at t-start, start re-acquiring MIB;
>>2: re-acquire MIB at t2 based on the first PCI and the first ARFCN;
>>2: (re) start T430 for the serving cell with the timer value set to the second ntn-UISyncValidityDuration (in the most recently re-acquired SIB19) from the SFN and subframe indicated by the second epochTime (in the most recently re-acquired SIB19);
>>>3: the SFN indicated by the second epochTime in the first SIB19 is determined from the MIB received at t2;
>>>3: if the second epochTime in the first SIB19 has already been passed, the initial value for T430 is adjusted accordingly (e.g. shortened by the amount of time that has already elapsed);
>>2: perform uplink transmission based on the second NTN configuration in the first SIB19 until T430 expires or second SIB19 is acquired (whichever comes first);
>>2: acquire second SIB19 before T430 expires;
>>2: restart T430 for the serving cell with the timer value set to the first ntn-UISyncValidityDuration (in the second SIB19) from the SFN and subframe indicated by the first epochTime (in the second SIB19);
>>>3: the SFN indicated by the first epochTime in the second SIB19 is determined from the MIB received at t2;
>>2: consider first NTN configuration for the serving cell in the second SIB19 valid while T430 is running;
>>2: performs uplink transmission based on the first NTN configuration in the second SIB19 while T430 is running;

The first SIB19 is SIB19 acquired before t-start. The second SIB19 is SIB19 acquired after t-start.
The first SIB19 (and second SIB19) includes:
>1: t-Service; t-Stop; t-Start;
>1: first NTN configuration:
>>2: first ntn-UISyncValidityDuration; first epochTime;
>>2: first cellSpecificKoffset; first kmac
>>2: first ta-info (e.g. first ta-Common, first ta-CommonDrift, first ta-CommonDrift Variant);
>>2: first ephemerisInfo;
>>2: first ta-Report;
>1: second NTN configuration:
>>2: second ntn-UISyncValidityDuration; second epochTime;
>>2: second cellSpecificKoffset; second kmac
>>2: second ta-info (e.g. second ta-Common, second ta-CommonDrift, second ta-CommonDriftVariant);

>>2: second ephemerisInfo;
>>2: second ta-Report;
For T430 management, UE may:
>1: determine the starting time of T430 for the first NTN configuration based on first MIB and first epochTime;
>1: determine the expiration time of T430 for the first NTN configuration based on the first MIB and first ntn-UISyncValidityDuration and first epochTime;
>1: determines the starting time of T430 for the second NTN configuration based on second MIB and second epochTime;
>1: determines the expiration time of T430 for the second NTN configuration based on the second MIB and second ntn-UISyncValidityDuration and second epochTime;
>the first epochTime and the first ntn-UISyncValidityDuration and the second epochTime and the second ntn-UISyncValidityDuration are received/acquired before t-stop (or t-service);
>the first MIB is the MIB received before t-stop (or t-service);
>the second MIB is the MIB received after t-start (or t-service or t-stop);

FIG. 3 illustrates operation of terminal.

At 3A-11, UE determines T_TA during a period_1 based on a variable offset determined based on the first NTN configuration received during the period_1.

At 3A-21, UE performs uplink transmission during the period_1 based on the determined T_TA.

At 3A-31, UE determines T_TA during a period_2 based on a variable offset determined based on the second NTN configuration received during the period_1.

At 3A-41, UE performs uplink transmission during the period_2 based on the determined T_TA.

At 3A-51, UE determines T_TA during period_3 based on a variable offset determined based on the first NTN configuration received after period_1.

At 3A-61, UE performs uplink transmission during the period_3 based on the determined T_TA.

Figure 4A:
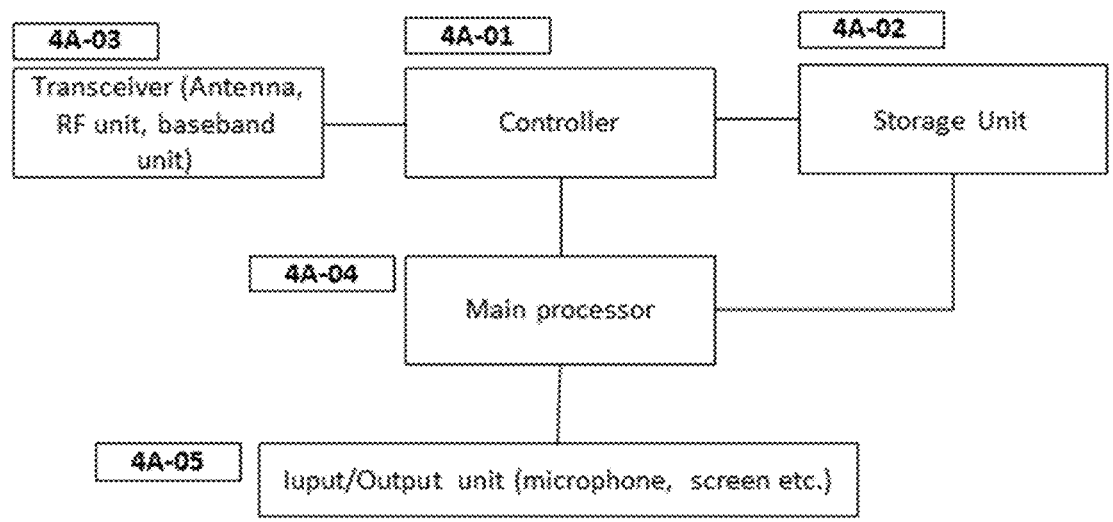
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
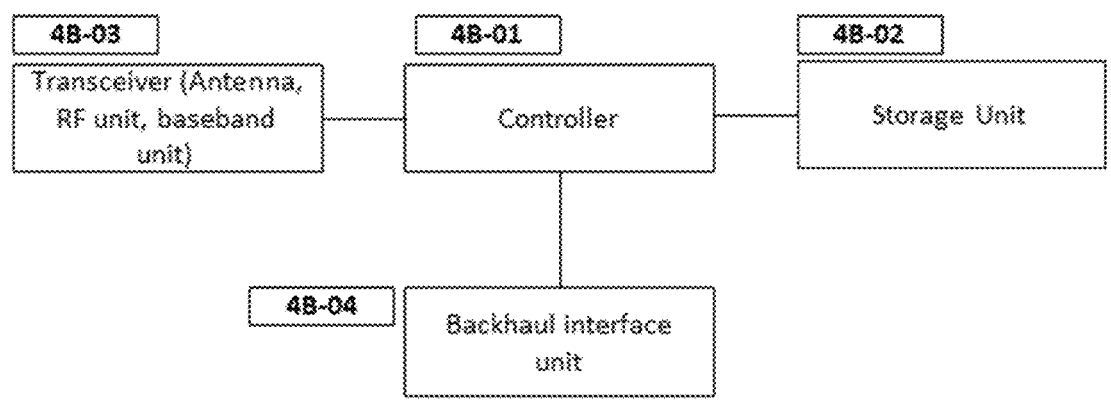
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DTX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| DL-AoD | Downlink Angle-of-Departure |
| GNSS | Global Navigation Satellite System |
| RACH | Random Access Channel |
| RAN | Radio Access Network |
| RAR | Random Access Response |
| RA-RNTI | Random Access RNTI |
| RAT | Radio Access Technology |
| RB | Radio Bearer |

TABLE 1-continued

| Acronym | Full name |
| --- | --- |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SS | Search Space |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CRP | Cell Reselection Priority |
| FPP | First positioning protocol |
| SPP | Second positioning protocol |
| DL-PRS | Downlink-Positioning Reference Signal |
| SL-PRS | Sidelink-Positioning Reference Signal |

What is claimed is:

1. A method by a terminal, the method comprising:
receiving by the terminal a first system information, wherein the first system information comprises a parameter for a constant offset for timing advance;
receiving by the terminal a second system information, wherein the second system information comprises:
a first non-terrestrial network (NTN) configuration;
a second NTN configuration; and
a parameter related to a stop time;
determining by the terminal a total amount of timing advance (TTA) based on the first NTN configuration or based on the second NTN configuration; and
performing by the terminal uplink transmission based on the TTA,
wherein the TTA is determined based on:
before the stop time, the first NTN configuration and the constant offset; and
after the stop time, the second NTN configuration and the constant offset, and
wherein, after the stop time, the terminal:
starts synchronizing to downlink of a specific cell indicated in the second system information; and
flushes a specific buffer.

2. The method of claim 1,
wherein the TTA is determined further based on a variable offset for timing advance.

3. The method of claim 2,
wherein, before the stop time, the variable offset for timing advance is determined based on:
   a parameter for drift rate of common timing advance (TA) in the first NTN configuration; and
   a parameter for satellite ephemeris in the first NTN configuration.

4. The method of claim 3,
wherein, after the stop time, the variable offset for timing advance is determined based on:
   the parameter for drift rate of common TA in the second NTN configuration; and
   the parameter for satellite ephemeris in the second NTN configuration.

5. The method of claim 4,
wherein the parameter for satellite ephemeris provides satellite ephemeris in format of position and velocity state vector.

6. The method of claim 1, wherein the method further comprising:
   receiving by the terminal the second system information after the stop time:
   wherein the terminal receives the second system information periodically based on a periodicity indicated in the second system information previously received, and
   wherein the periodicity of the second system information acquisition is determined based on:
      before the stop time, a first parameter related to acquisition periodicity in the first NTN configuration; and
      after the stop time, a second parameter related to acquisition periodicity in the second NTN configuration.

7. The method of claim 6,
wherein the TTA is determined based on:
   during a first period, the first NTN configuration received before the stop time;
   during a second period, the second NTN configuration received before the stop time; and
   during a third period, the first NTN configuration received after the stop time.

8. The method of claim 7 wherein:
the first period is a period before the stop time;
the second period is a period after the stop time and before the second system information is received first time after the stop time; and
the third period is a period after the second system information is received first time after the stop time.

9. The method of claim 8,
wherein the constant offset for timing advance received during the first period is used during:
   the first period;
   the second period; and
   the third period.

10. The method of claim 9,
wherein the first system information further comprises random access configuration.

11. The method of claim 10,
wherein the terminal determines timing relationship based on:
   a first scheduling offset during the first period; and
   a second scheduling offset during the second period.

12. The method of claim 11,
wherein the first scheduling offset and the second scheduling offset are comprised in the second system information.

13. The method of claim 6,
wherein time point for next second system information reception is determined based on previously received second system information.

14. The method of claim 1,
wherein the first NTN configuration and the second NTN configuration are associated with a special cell.

15. A terminal comprising:
a transceiver,
a memory, and
a controller coupled to the transceiver and the memory, wherein the controller is configured to cause the terminal to:
receive a first system information, wherein the first system information comprises a parameter for a constant offset for timing advance,
receive a second system information, wherein the second system information comprises:
   a first non-terrestrial network (NTN) configuration;
   a second NTN configuration; and
   a parameter related to a stop time,
determine a total amount of timing advance (TTA) based on the first NTN configuration or based on the second NTN configuration, and
perform uplink transmission based on the TTA,
wherein the TTA is determined based on:
before the stop time, the first NTN configuration and the constant offset; and
after the stop time, the second NTN configuration and the constant offset, and
wherein, after the stop time, the terminal:
   starts synchronizing to downlink of a specific cell indicated in the second system information; and
   flushes a specific buffer.

* * * * *